United States Patent
Kuroda et al.

(10) Patent No.: US 6,408,123 B1
(45) Date of Patent: Jun. 18, 2002

(54) NEAR-FIELD OPTICAL PROBE HAVING SURFACE PLASMON POLARITON WAVEGUIDE AND METHOD OF PREPARING THE SAME AS WELL AS MICROSCOPE, RECORDING/REGENERATION APPARATUS AND MICRO-FABRICATION APPARATUS USING THE SAME

(75) Inventors: Ryo Kuroda, Kawasaki; Yasuhiro Shimada, Hadano; Takako Yamaguchi, Atsugi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/708,587

(22) Filed: Nov. 9, 2000

(30) Foreign Application Priority Data

Nov. 11, 1999 (JP) .............................. 11-321445

(51) Int. Cl.⁷ .............................. G02B 6/10; G02B 21/00
(52) U.S. Cl. .............................. 385/130; 385/12; 385/13; 385/37; 385/14; 385/131; 385/147; 385/31; 385/32; 385/39; 385/43; 385/30; 359/368
(58) Field of Search .............................. 385/12, 13, 15, 385/31, 38, 39, 43, 123, 125, 129, 130, 131, 14, 133, 147, 37; 359/656, 368

(56) References Cited

U.S. PATENT DOCUMENTS

| | | | | |
|---|---|---|---|---|
| 4,915,482 A | * | 4/1990 | Collins et al. ............... | 385/1 X |
| 5,485,277 A | * | 1/1996 | Foster ......................... | 356/445 |
| 5,583,643 A | * | 12/1996 | Gass et al. .................... | 356/445 |
| 5,677,978 A | | 10/1997 | Lewis et al. ............. | 385/147 X |
| 5,729,641 A | * | 3/1998 | Chandonnet et al. ........... | 385/2 |
| 5,858,799 A | * | 1/1999 | Yee et al. .................... | 436/164 |
| 6,034,809 A | * | 3/2000 | Anemogiannis ............. | 359/254 |
| 6,201,226 B1 | | 3/2001 | Shimada et al. .......... | 250/201.3 |
| 6,282,005 B1 | * | 8/2001 | Thompson et al. .......... | 359/173 |

FOREIGN PATENT DOCUMENTS

EP  0 112 401  7/1984  .............. 385/12 X

OTHER PUBLICATIONS

K. Lieberman, et al., "Multifunctional, Micropipette Based Force Cantilevers for Scanned Probe Microscopy," Appl. Physics Letter vol. 65, No. 5, pp. 648–650, Aug. 1, 1994.

R.C. Reddick, et al., "New Form of Scanning Optical Microscopy," Physical Review B, vol. 39, No. 1, pp. 767–770, Jan. 1, 1989.

U. Dürig, et al., "Near–Field Optical–Scanning Microscopy," J. Appl. Phys. vol. 59, No. 10, pp. 3318–3327, May 15, 1986.

* cited by examiner

*Primary Examiner*—Brian Healy
(74) *Attorney, Agent, or Firm*—Fitzpatrick, Cella, Harper & Scinto

(57) ABSTRACT

A near-field optical probe comprises a micro-aperture for irradiating and/or detecting evanescent light through the front end of the probe, an elastically deformable cantilever supporting the micro-aperture at the free end thereof, and a surface plasmon polariton waveguide arranged on the cantilever to guide light from a light source to the micro-aperture and/or to guide light from a light source introduced through the micro-aperture.

11 Claims, 12 Drawing Sheets

NEAR-FIELD OPTICAL PROBE HAVING SURFACE PLASMON POLARITON WAVEGUIDE AND METHOD OF PREPARING THE SAME AS WELL AS MICROSCOPE, RECORDING/REGENERATION APPARATUS AND MICRO-FABRICATION APPARATUS USING THE SAME

BACKGROUND OF THE INVENTION

1. Field of the Invention

This invention relates to a near-field optical probe and a method of preparing the same as well as a microscope, a recording/regeneration apparatus and a micro-fabrication apparatus using the same. More particularly, the present invention relates to a near-field optical probe to be suitably used for a microscope capable of observing micro-structures below the diffraction limit of light, a storage device capable of forming and detecting micro recording bits or a micro-fabrication apparatus capable of producing micro-structures.

2. Related Background Art

In recent years, the resolution of microscopes has been dramatically improved to make it possible to observe specimens as small as a molecule or even an atom by bringing the sharp tip of a probe to the specimen as close as 100 nm or less as a result of the technological development in the field of SPM (scanning probe microscope) typically including STM (scanning tunnelling microscope) and AFM (atomic force microscope).

From the viewpoint of the types of light used for SPM, there have been developed near-field optical microscope (to be referred to as SNOM hereinafter) adapted to observe the surface of a specimen by utilizing the evanescent light oozing out from a micro-aperture arranged at the tip of a sharp optical probe [EPO112401, Durig et al., J. Appl. Phys. Vol. 59, p. 3318 (1986)] and photon STM (to be referred to as PSTM hereinafter) adapted to observe the surface of a specimen by causing light to enter the surface from the rear surface thereof so as to be,totally reflected in the inside and detecting the evanescent light oozing out to the surface of the specimen by means of an optical probe [Reddick et al., Phys. Rev. B, Vol. 39, p. 767 (1989)].

With a SNOM, it is now possible to access a micro-area of 100 nm or less and detect optical information therefrom.

Efforts have been made to develop high density storage devices that surpass the limit of diffraction of light for conventional ones and ultra-micro-fabrication apparatus by irradiating a recording medium or resist with evanescent light emitted from a micro-aperture, utilizing the theory of the SNOM.

Meanwhile, the technique of preparing the optical probe is vitally important for the SNOM. A typical known method of preparing an optical probe for the SNOM comprises melting an optical fiber and extending it along the central axix either by irradiating it with a $CO_2$ laser beam or arranging it between a pair of discharge electrodes, and after sharpening the tip, it is coated with metal from a lateral side while rotating it around the central axis to form a portion having a thin metal film layer at the front end thereof, which is then processed to produce a micro-aperture.

With another technique of sharpening the tip at the front end of an optical fiber, the core is selectively etched to be sharpened by utilizing the difference in the etching rate between the core and the clad relative to the selected etching solution due to the difference in chemical composition.

Evanescent light penetrating through the micro-aperture of an optical probe that is prepared in any of the above described methods and mounted on a SNOM, a storage device or a micro-fabrication apparatus attenuates exponentially as a function of the distance from the micro-aperture, and therefore the optical probe has to be positionally controlled so that the distance between its front end and the specimen, the recording medium or the resist is practically held less than 100 nm.

A shear force control technique or a so-called AFM control technique is popularly used for controlling the above distance. With the shear force control technique, the optical probe is made to oscillate transversally so that the rate of the decrease in the amplitude of oscillation of the optical probe that is caused by the van der Waals force when the front end of the optical probe approaches the specimen is held to be constant. With the AFM control technique, on the other hand, the optical probe is bent to operate as a cantilever so that the amount of flexure of the cantilever caused by the van der Waals force when the front end of the optical probe approaches the specimen is held to be constant.

With the shear force control technique or the AFM control technique, the surface profile of the specimen can be observed, so that highly sophisticated action of an apparatus can be realized when using SNOM signals therewith. For example, from optical and profile information, information on the material of the specimen can be obtained by means of a SNOM apparatus. A storage device utilizing the theory of the SNOM can perform tracking operations using AFM signals. Moreover, a micro-fabrication apparatus utilizing the theory of the SNOM can be used for aligning operations using AFM signals.

The AFM control technique includes a so-called open-loop control technique in which the front end of the probe is held in direct contact with the specimen to make it follow the profile of the surface of the specimen by utilizing the flexure of the cantilever, which is also referred to as contact mode or repulsive force mode. Not only can this technique further simplify the configuration of the apparatus, but it can also make the probe to scan the surface of the specimen at an enhanced rate, because it does not require the use of a feedback loop for controlling the distance between the front end of the optical probe and the surface of the specimen. Then, as a result, it is possible to realize SNOMs that can quickly obtain an observed image of the specimen, high speed recording/reproduction apparatus and high speed micro-fabrication apparatus.

With a known technique that can be used to bend an optical probe for the purpose of AFM control, the optical probe is molten by irradiating a $CO_2$ laser beam to the front end of the optical probe or arranging the optical probe between a pair of discharge electrodes (U.S. Pat. No. 5,677, 978; Lieberman et al., Appl. Phys. Lett. 65, p. 648 (1994); Near-Field Nano-Photonics Handbook, ed. by M. Ohtsu, p. 42 (1997)).

In the case of a contact mode AFM, if the specimen, the recording medium or the resist consists of such a relatively flexible material as an organic molecule or a bio-polymer, a large force acts between the probe front end and the specimen, the recording medium or the resist during the scanning operation of the probe to destroy the specimen, the recording medium or the resist surface as well as the probe front end, if the cantilever is rigid. Therefore, the modulus of elasticity of the cantilever in terms of flexure has to be less than 0.1N/m, preferably less than 0.03N/m in order to avoid this problem of destruction.

Optical fibers guide waves of light by utilizing the total reflection at the interface of the core portion having a high refractive index and the cladding portion having a low refractive index. FIG. 16 of the accompanying drawings schematically illustrates the structure of a known optical probe where the front end is made sharp and bent to operate as a cantilever and the core 1401 and the cladding 1402 are coaxially arranged.

Since optical fibers have been developed mostly for the purpose of optical telecommunications using a near infrared laser beam, the core diameter of single mode fibers having a relatively small core is generally between 2 and 10 $\mu$m. As a result, when an optical probe is prepared by using such an optical fiber, the outer diameter d of the optical probe will be at least about 10 $\mu$m (see FIG. 16).

Optical fibers are mostly made of quartz ($SiO_2$) and the cantilever formed from an optical probe with an outer diameter greater than 10 $\mu$m has to have a length L not less than 1 mm as measured from the support thereof in order to reduce the modulus of elasticity in terms of flexure to less than 0.1N/m, when calculated on the basis of the related physical constants of quartz. Then, the resonance frequency of the cantilever will be as low as less than 8 kHz if observed in the direction of flexure. When the resonance frequency of the cantilever is low, the characteristics of the follow-up frequency of the probe relative to the undulations of the surface of the specimen, the recording medium or the resist are lowered to reduce the resolution of observation, to give rise to recording/reproduction errors or to lower the micro-fabrication accuracy.

As a result, it is impossible to realize a high resolution SNOM adapted to high speed observations, a storage device having a high data-transferring rate and a low error rate or a high precision micro-fabrication apparatus with a large throughput.

While a probe with a low modulus of elasticity and a high resonance frequency can be obtained by preparing an optical fiber having a core diameter smaller than 1 $\mu$m to form a cantilever optical probe therewith, an optical fiber having a core diameter less than 1 $\mu$m cannot practically transmit any light and hence cannot be used for an optical probe because the size of the core is not greater than the wavelength of light.

SUMMARY OF THE INVENTION

In view of the above problems, it is therefore the object of the present invention to provide a near-field optical probe having a low modulus of elasticity and a high resonance frequency and a method of preparing the same as well as a microscope, a recording/reproduction apparatus and a micro-fabrication apparatus realized by using such a near-field optical probe and the method of preparing the same.

According to the invention, the above object is achieved by providing a near-field optical probe comprising:

a micro-aperture for irradiating and/or detecting evanescent light through the front end of the probe;

an elastically deformable cantilever supporting the micro-aperture at the free end thereof; and a surface plasmon polariton waveguide arranged on the cantilever to guide light from a light source to the micro-aperture and/or to guide light from a light source introduced through the micro-aperture.

In another aspect of the invention, there is also provided a method of preparing a near-field optical probe comprising the steps of:

(a) preparing a first probe substrate having a surface plasmon polariton waveguide;

(b) preparing a laser substrate;

(c) preparing a second probe substrate by forming a groove on a substrate followed by forming a probe layer on the groove except the bottom thereof;

(d) bonding said first probe substrate with said laser substrate to form a laser profile pattern thereon followed by forming an insulating layer and an upper electrode;

(e) bonding said first probe substrate subjected to said step (d) and said second probe substrate to transfer said probe layer on said second probe substrate to a bonding layer formed on said first probe substrate; and (f) forming a cantilever probe having a probe proper projecting from the free end thereof by partly removing said first probe substrate subjected to said step (e).

In still another aspect of the invention, there are provided a near-field optical microscope, a storage device and a micro-fabrication apparatus comprising a near-field optical probe according to the invention.

Now, the present invention will be described by referring to the accompanying drawings that illustrate preferred embodiments of the invention.

DESCRIPTION OF THE PREFERRED EMBODIMENTS

Figure 1:
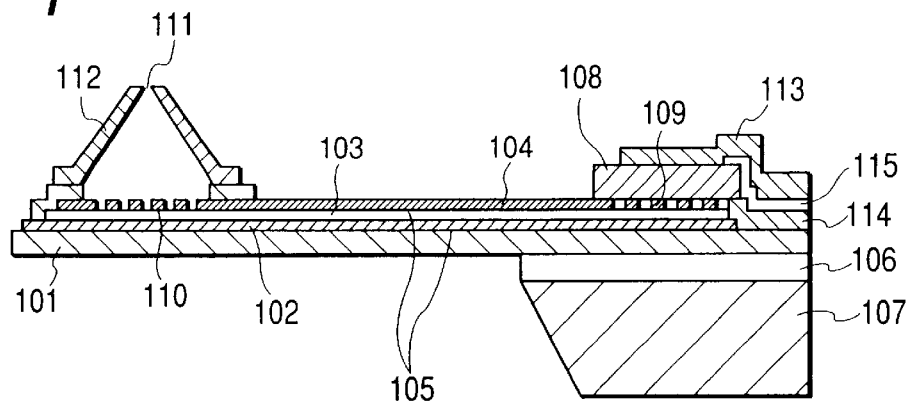
FIG. 1 is a schematic illustration of Embodiment 1 of a near-field optical probe according to the invention, showing its configuration.

As pointed out earlier, an optical fiber having a core diameter not greater than the wavelength of light cannot transmit any ordinary light (a three-dimensional light wave) by way of the core because of the limit of diffraction of light. In other words, for an optical fiber to transmit a three-dimensional light wave, the core diameter has to be several times as large as the wavelength of light (2 to 10 $\mu$m).

On the other hand, a surface wave referred to as surface plasmon polariton can be transmitted along the interface of a negative dielectric substance showing a negative dielectric constant and a dielectric substance. When a light wave having an electric field that is perpendicular to the surface of a negative dielectric substance is applied, a surface charge is induced, which oscillates to cause a surface plasmon polariton.

Certain metals such as Ag and Au show a negative dielectric constant relative to light of visible to infrared regions to make themselves negative dielectric substances.

Meanwhile, in the case of a negative dielectric film formed by sandwiching a negative dielectric substance between a pair of dielectric substances or a negative gap formed by sandwiching a dielectric substance between a pair of negative dielectric substances, the surface plasmon polaritons of the respective interfaces become coupled with each other when the distance between the two interfaces is small. Thus the coupled mode can be propagated along the interfaces. Such a coupled mode is referred to as a Fano mode. While the Fano mode is divided into several modes, there are certain modes among them in which the coupled mode can be propagated regardess of how small the distance between the interfaces is (compared with the wavelength of light), including the odd mode of the negative dielectric film and the even mode of the negative dielectric gap.

Thus, it is possible to substantially transmit light through a thin waveguide by temporarily transforming a three-dimensional light wave into surface plasmon polaritons and transmitting it as surface plasmon polaritons through the waveguide having a thickness less than the wavelength of light, thereby transforming the surface plasmon polaritons back into a three-dimensional light wave.

Therefore, by forming a waveguide for transmitting surface plasmon polaritons in the cantilever of an optical probe, it is possible to make the thickness of the waveguide smaller than the wavelength of light. Accordingly, the thickness of the cantilever can be reduced to less than 1 $\mu$m. Then, the cantilever can be made to have a high resonance frequency and a low modulus of elasticity and to transmit light in a state that it is transformed into surface plasmon polaritons, without increasing the length of the cantilever.

For instance, when a cantilever having a width of 20 $\mu$m is formed by using a 1 $\mu$m thick Si, its modulus of elasticity can be reduced to less than 0.1N/m in terms of flexure, as determined on the basis of physical constants of Si, if its length from the support is greater than 100 $\mu$m. Then, the resonance frequency can be made equal to about 100 kHz to enable high speed scanning.

Thus, it is possible to realize a cantilever optical probe having a low modulus of elasticity and a high resonance frequency. Such a cantilever optical probe can be made to contact with a specimen, a recording medium or a resist each having a flexible surface at the front end of the probe to scan the surface thereof using the AFM control technique with the contact mode without destroying the surface and the front end of the probe. Accordingly, additionally due to the high resonance frequency, high speed scanning can be carried out.

Now, some preferred embodiments of the invention will be described below.

Embodiment 1

FIG. 1 is a schematic illustration of Embodiment 1 of a near-field optical probe according to the invention, showing its configuration. In FIG. 1, there are shown a 300 nm thick Si cantilever 101, a 150 nm thick Ag thin film 102, a 100 nm thick PMMA (polymethylmethacrylate) resin thin film 103 and another 150 nm thick Ag thin film 104. With this arrangement, the interface of the Ag thin film 102 and the PMMA resin thin film 103 and that of the PMMA resin thin film 103 and the Ag thin film 104 provide a surface plasmon polariton waveguide 105.

The fixed end of the Si cantilever 101 is rigidly secured to an Si substrate 107 by way of an $SiO_2$ thin film 106. Furthermore, a vertical-cavity surface-emitting laser 108 is connected to the surface plasmon polariton waveguide 105 at the fixed end of the Si cantilever 101 by way of a grating coupler 109 having a cycle smaller than the wavelength of the laser beam emitted from the laser 108.

A grating coupler 110 having a cycle smaller than the wavelength of the laser beam emitted from the vertical-cavity surface-emitting laser 108 is fitted to the free end of the Si cantilever 101 and a probe 112 having a micro-aperture 111 less than 100 nm at the tip thereof is fitted above the grating coupler 110.

The vertical-cavity surface-emitting laser 108 is provided with an upper electrode 113 and a lower electrode 114, which are separated from each other by an insulating film 115. Thus, when a voltage is applied between the upper electrode 113 and the lower electrode 114 to drive the vertical-cavity surface-emitting laser 108, it emits a laser beam directed to the grating coupler 109.

The laser beam is scattered by the grating coupler 109 to produce evanescent light and to interact with the free electrons in the Ag thin films 102 and 104 and the dielectric polarization in the PMMA resin thin film 103, thereby exciting surface plasmon polaritons. Note that the use of a grating coupler provides an effect of enabling a highly efficient transformation between surface plasmon polaritons and a three-dimensional light wave.

When the distance between the two interfaces, or the thickness of the PMMA resin thin film 103 is as small as about 100 nm, the surface plasmon polaritons of the respective surfaces are coupled to transmit along the interfaces in a coupled mode referred to as Fano mode. While a three-dimensional light wave cannot normally be transmitted through a waveguide smaller than its wavelength, it is possible to transmit the light wave through a waveguide much smaller than its wavelength by transforming it into surface plasmon polaritons in a coupled mode.

The excited surface plasmon polaritons are transmitted in the coupled mode along the interface of the Ag thin film 102 and the PMMA resin thin film 103 and that of the PMMA resin thin film 103 and the Ag thin film 104 toward the free end of the Si cantilever 101. The surface plasmon polaritons transmitted in the coupled mode are scattered by the grating coupler 1110 and transformed into a three-dimensional light wave, which is then emitted into the inside of the probe 112.

The emitted light wave is reflected and converged by the tapered part of the inside of the probe 112 to strike the inside of the micro-aperture 111. Since the micro-aperture 111 is smaller than the wavelength of the incident light, only a small portion thereof is emitted through the aperture. However, evanescent light locally exists near the aperture. Evanescent light attenuates exponentially as a function of the distance from the aperture. A near-field optical probe of this type to emit evanescent light is applied to a microscope, a storage device or a micro-fabrication apparatus as will be discussed hereinafter.

Embodiment 2

The waveguide for surface plasmon polaritons of the above described Embodiment 1 was prepared by sandwiching an about 100 nm thick dielectric thin film between a pair of metal films. However, a waveguide for surface plasmon polaritons can alternatively be formed by sandwiching an about 100 nm thick metal thin film between a pair of dielectric films as in the case of Embodiment 2. Now, this embodiment of a near-field optical probe will be described below.

Figure 2:
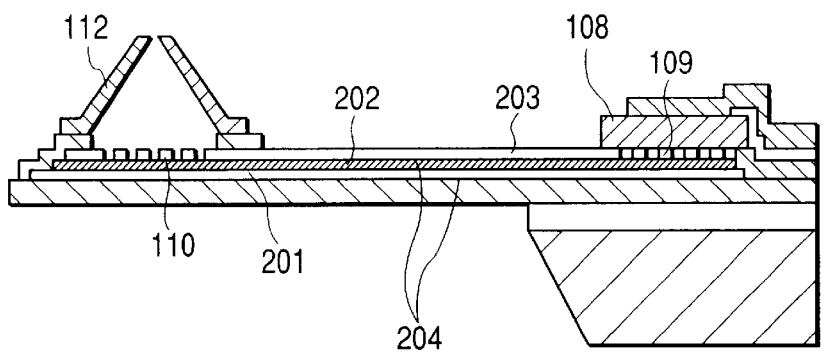
FIG. 2 is a schematic illustration of Embodiment 2 of a near-field optical probe according to the invention, showing its configuration.

In FIG. 2, there are shown a 150 nm thick PMMA resin thin film 201, a 100 nm thick Ag thin film 202 and another 150 nm thick PMMA resin thin film 203. With this arrangement, the interface of the PMMA resin thin film 201 and the Ag thin film 202 and that of the Ag thin film 202 and the PMMA resin thin film 203 provide a waveguide 204 for surface plasmon polaritons.

With this arrangement again, the surface plasmon polaritons of the respective surfaces are coupled to transmit along the interfaces in a coupled mode referred to as Fano mode when the distance between the two interfaces, or the thickness of the Ag thin film 202 is as small as about 100 nm.

The coupling of the laser beam emitted from the vertical-cavity surface-emitting laser 108 at the grating coupler 109 and the transformation into light to be emitted into the inside of the probe 112 are the same as those described above for Embodiment 1.

The waveguides 105, 204 for surface plasmon polaritons of the above described Embodiments 1 and 2 are connected to a light source such as a vertical-cavity surface-emitting laser 108 to introduce light to be transformed into surface plasmon polaritons that are transmitted through the waveguide. However, the present invention is by no means limited thereto and a photodetector such as a photodiode may be connected to the optical probe in order to detect surface plasmon polaritons transmitted through the waveguide.

Figure 3:
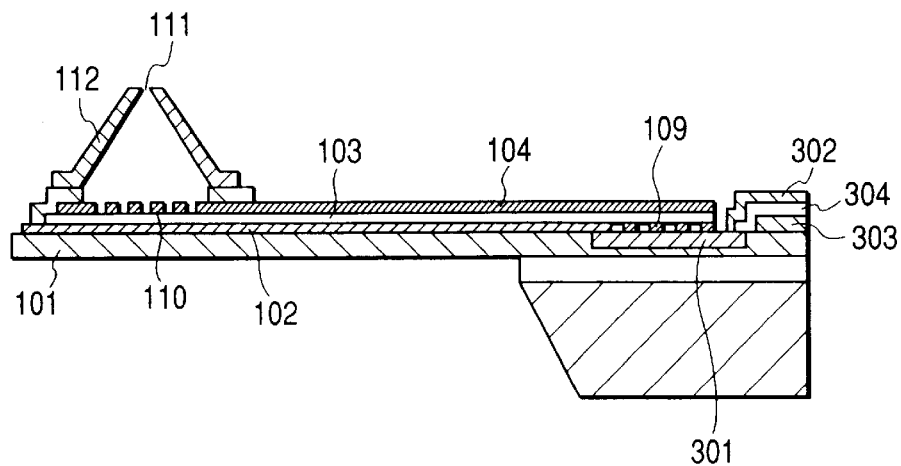
FIG. 3 is a schematic illustration of a near-field optical probe according to the invention connected to a photodetector.

FIG. 3 shows an arrangement of connecting a photodetector to a near-field optical probe according to the invention. Referring to FIG. 3, when evanescent light entering the inside of the probe proper 112 through a micro-aperture smaller than 100 nm is scattered, it is transformed into propagating light to irradiate the grating coupler 110. Then, the light is scattered by the grating coupler 110 to turn into evanescent light, which interacts with the free electrons in the Ag thin films 102 and 104 and the dielectric polarization in the PMMA resin thin film 103 to excite surface plasmon polaritons.

Then, as described earlier, the surface plasmon polaritons of the respective surfaces are coupled to transmit along the interface of the Ag thin film 102 and the PMMA resin thin film 103 and that of the PMMA resin thin film 103 and the Ag thin film 104 toward the fixed end of the Si cantilever 101 in a Fano mode. The transmitted surface plasmon polaritons are scattered by the grating coupler 110 and transformed into a three-dimensional light wave, which intensity thereof is detected by the photodetector 301. In FIG. 3, reference numerals 302 and 303 respectively denote an upper electrode for taking out the photoelectric current of the photodetector 301 and a lower electrode, and reference numeral 304 denotes an insulating film. Note that the use of the grating coupler 109 provides an effect of enabling a highly efficient transformation between surface plasmon polaritons and a three-dimensional light wave.

A near-field optical probe of this type which detects evanescent light is applied to a microscope, a storage device or a micro-fabrication apparatus as will be discussed hereinafter.

In the above described embodiment, a grating coupler 110 is used for the portion to transform surface plasmon polaritons into a three-dimensional light and to irradiate the micro-aperture 111. As stressed above, the use of a grating coupler provides an effect of enabling a highly efficient transformation between surface plasmon polaritons and a three-dimensional light wave.

Figure 4:
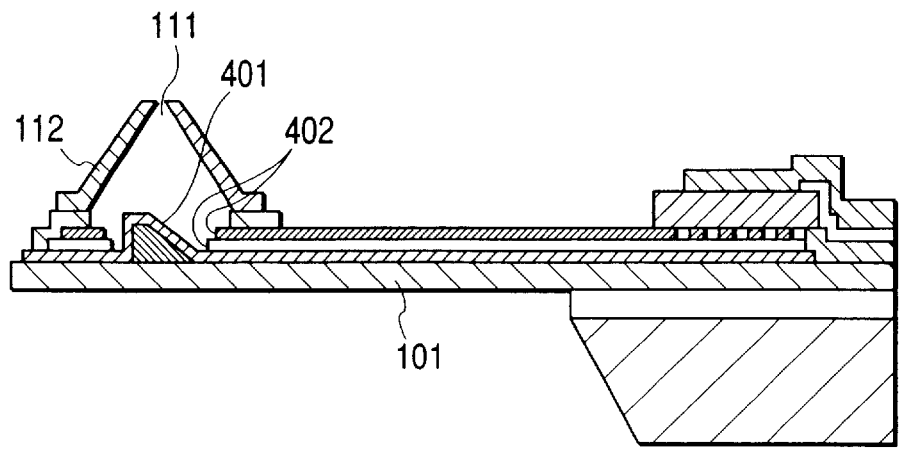
FIG. 4 is a schematic illustration showing a mirror arranged in the inside of a near-field optical probe according to the invention.
Figure 5:
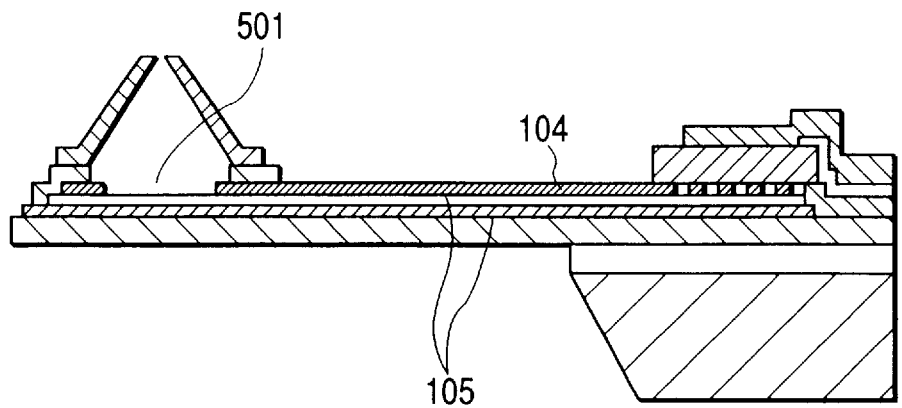
FIG. 5 is a schematic illustration showing a window area of a near-field optical probe according to the invention, formed by removing the Ag thin film constituting the surface plasmon polariton waveguide in the inside of the probe.

Alternatively, a mirror 401 fitted to the inside of the probe 112 may be used as shown in FIG. 4 or a window 501 may be formed by partly removing the upper Ag thin film 104 that defines the waveform 105 for surface plasmon polaritons in the inside of the probe 112 as shown in FIG. 5.

Referring to FIG. 4, the surface plasmon polaritons transmitted through the waveguide for surface plasmon polaritons are scattered by the end facet 402 of the waveguide located near the free end of the Si cantilever 101 and transformed into a three-dimensional light wave, which is reflected by a mirror 401 to irradiate the micro-aperture 111. The use of a mirror 401 allows less precision for the process of preparing the optical probe to improve the manufacturing yield, if compared with the case of using a grating coupler.

Referring now to FIG. 5, the surface plasmon polaritons transmitted through the waveguide for surface plasmon polaritons are scattered by a window 501 arranged at the waveguide and transformed into a three-dimensional light wave, which is scattered to irradiate the micro-aperture 111. The use of a window 501 allows a still less precision for the process of preparing the optical probe to improve the manufacturing yield, compared with the case of using a grating coupler or a mirror, but the efficiency of transforming surface plasmon polaritons into a three-dimensional light wave may be slightly lowered.

Now, a method of preparing a near-field optical probe according to the invention will be described by referring to FIGS. 6A through 11H.

Figure 6A:
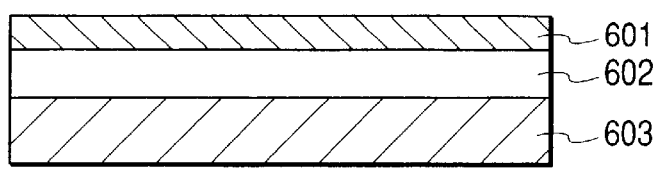
FIGS. 6A, 6B, 6C and 6D are schematic illustrations showing the process of preparing a probe substrate in the method of preparing a near-field optical probe according to the invention.

An SOI (silicon on insulator) wafer is used as a starting substrate. FIG. 6A schematically illustrates the configuration of an SOI wafer comprising a 300 nm thick Si thin film 601, an $SiO_2$ thin film 602 and an Si substrate 603.

Figure 6B:
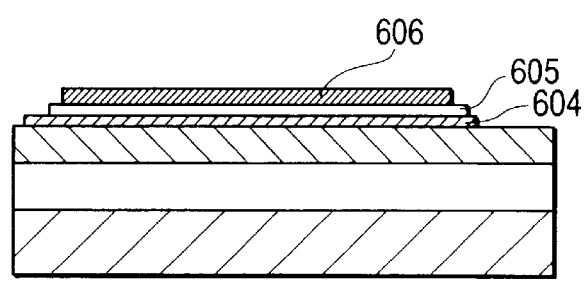

Then, a 150 nm thick Ag thin film is formed on the Si thin film 601 by sputtering and subjected to a patterning operation to form a pattern of the waveguide for surface plasmon polaritons by photolithography. Thereafter, a PMMA resin dissolved in a solvent is applied to the surface thereof by spin coating to produce a 100 nm thick PMMA resin thin film 605, which is also subjected to a patterning operation. Subsequently, another 150 nm thick Ag thin film 606 is formed on the surface thereof also by sputtering and subjected to a patterning operation (FIG. 6B).

Figure 6C:
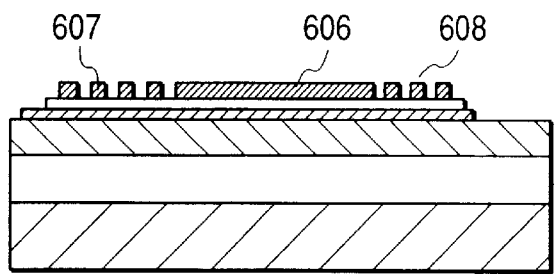

Then, a pair of grating coupler profile formed sections 607, 608 are formed in the Ag thin film 606 (FIG. 6C).

Figure 6D:
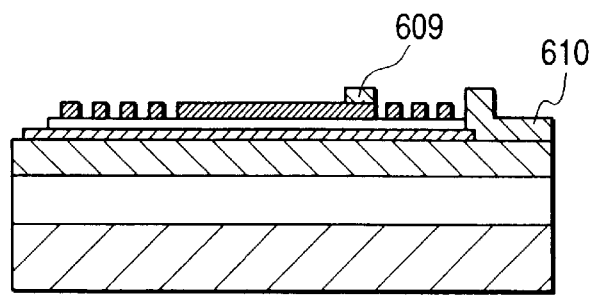

Thereafter, an Au bonding layer 609 for bonding a vertical-cavity surface-emitting laser and an Au lower electrode 610 for driving the vertical-cavity surface-emitting laser are formed by patterning an Au film formed thereon to produce a finished probe substrate (FIG. 6D).

Figure 7A:
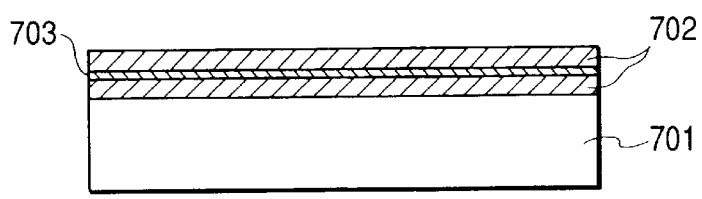
FIGS. 7A and 7B are schematic illustrations of the process of preparing a laser substrate in the method of preparing a near-field optical probe according to the invention.

The vertical-cavity surface-emitting laser to be bonded to the probe substrate is prepared in a manner as described below. Firstly, a single wavelength resonator layer 703, comprising an AlGaAs/GaAs multi-quantum well active layer and an AlGaAs spacer layer, sandwiched between a pair of AlGaAs/AlAs multilayer film mirror layers 702 is formed by epitaxial growth, using a MOVPE (metal organic vapor phase epitaxial growth) technique (FIG. 7A).

Figure 7B:
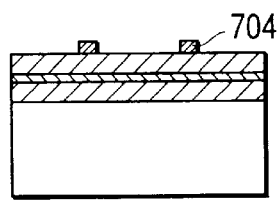

Then, after forming an Au bonding layer for bonding it to the probe substrate, it is cut to a size suitable for the bonding by means of a dicing cutter to produce a laser substrate (FIG. 7B).

Figure 8A:
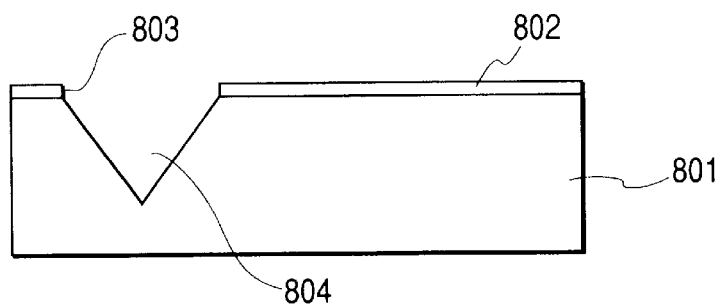
FIGS. 8A, 8B and 8C are schematic illustrations of the process of preparing a probe substrate in the method of preparing a near-field optical probe according to the invention.

The probe having a micro-aperture to be bonded to the probe substrate is prepared in a manner as described below. Firstly an $Si_3N_4$ thin film 802 is formed on an Si substrate 801 having a plane direction of (100) and then a rectangular opening 803 is produced there. Subsequently, a V-shaped groove 804 is formed there by anisotropic etching, using a KOH solution (FIG. 8A).

Figure 8B:
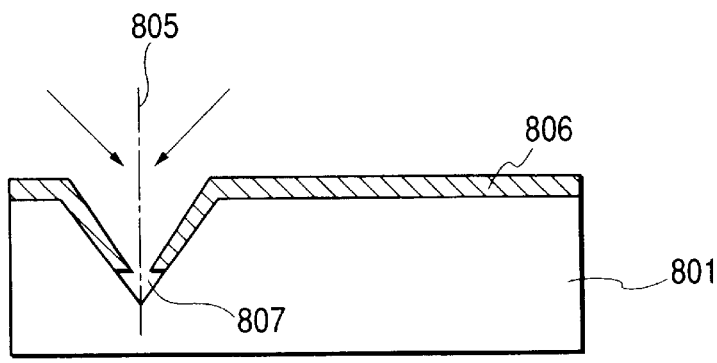

Then, after removing the $Si_3N_4$ thin film 802, an Au film 806 having an opening at tip of the V-shaped groove 807 is formed on the surface of the Si substrate 801 by depositing Au vapor in an inclined direction, while rotating the Si substrate 801 around the axis of rotation 805 that agrees with a normal to the surface of the Si substrate 801 (FIG. 8B).

Figure 8C:
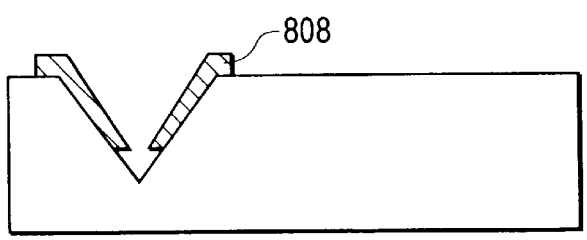

Finally, the Au film 806 is subjected to a patterning operation to produce a bonding probe 808. The substrate carrying the probe 808 will be referred to as a probe substrate (FIG. 8C).

Figure 9A:
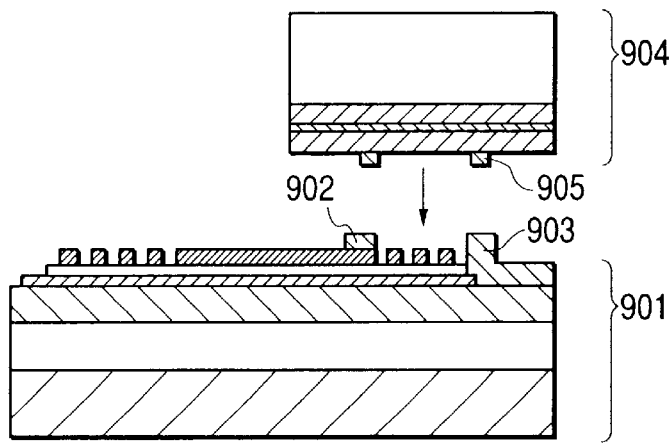
FIGS. 9A, 9B and 9C are schematic illustrations of part of the method of preparing a near-field optical probe according to the invention.
Figure 9B:
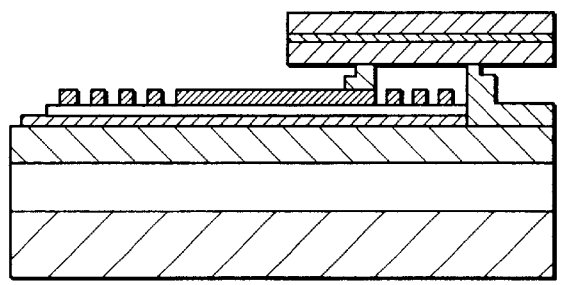

Then, a near-field optical probe is prepared by using the above three substrates. Firstly, the bonding layer 902 and the Au lower electrode 903 formed on the probe substrate 901 as described above by referring to FIG. 6D are arranged vis-a-vis the Au bonding layer 905 formed on the laser substrate 904 as described above by referring to FIG. 7B to bond them together (FIGS. 9A and 9B).

Figure 9C:
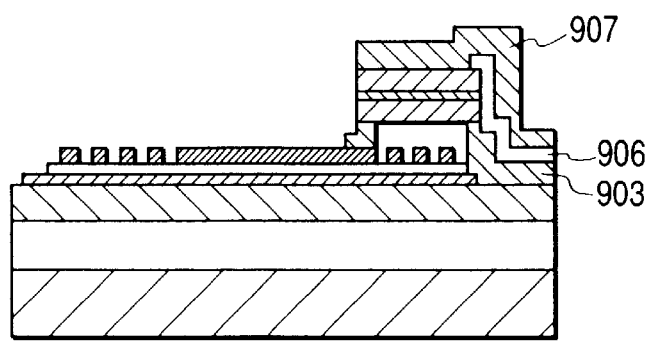

Then, the laser substrate 904 is subjected to a patterning operation to produce a vertical-cavity surface-emitting laser, and thereafter an insulating layer 906 and an upper electrode 907 for driving the laser are formed (FIG. 9C).

Figure 10D:
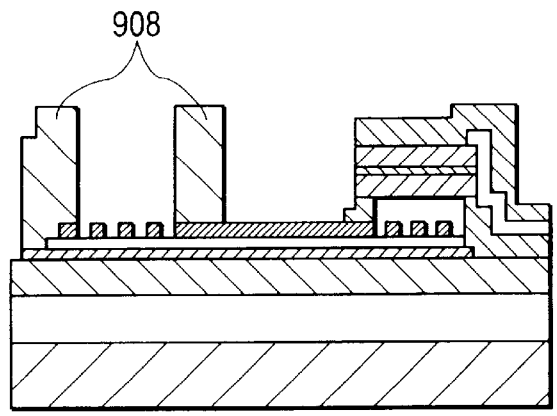
FIGS. 10D, 10E and 10F are schematic illustrations of part of the method of preparing a near-field optical probe according to the invention.
Figure 10E:
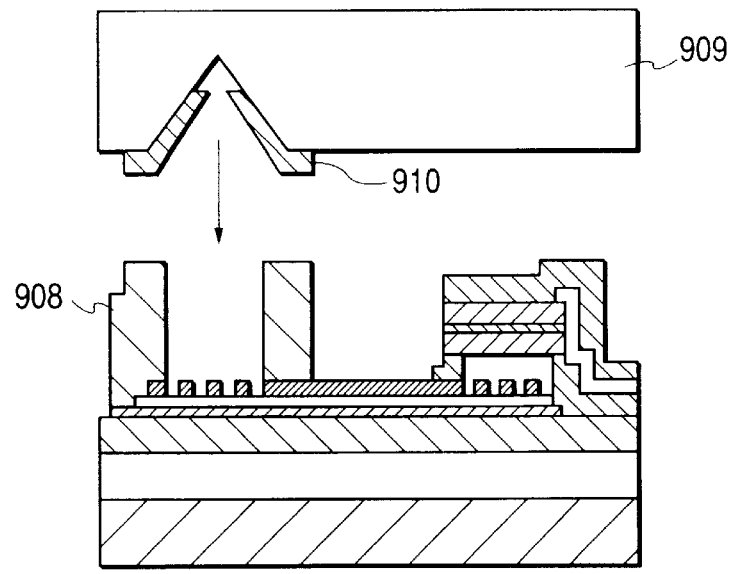
Figure 10F:
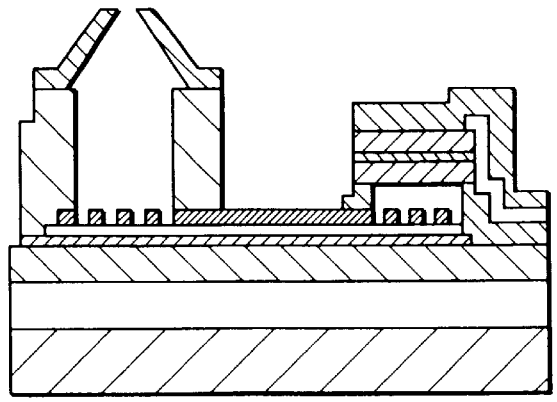

Subsequently, an Au film having an Au bonding layer 908 formed by evaporation to which the probe proper is to be bonded is formed by a patterning operation (FIG. 10D). Then, the Au bonding layer 908 and the bonding probe 910 on the probe substrate 909 as shown in FIG. 8C are arranged vis-a-vis to bond them together. Thereafter, the probe substrate 909 is removed (FIGS. 10E and 10F).

Figure 11G:
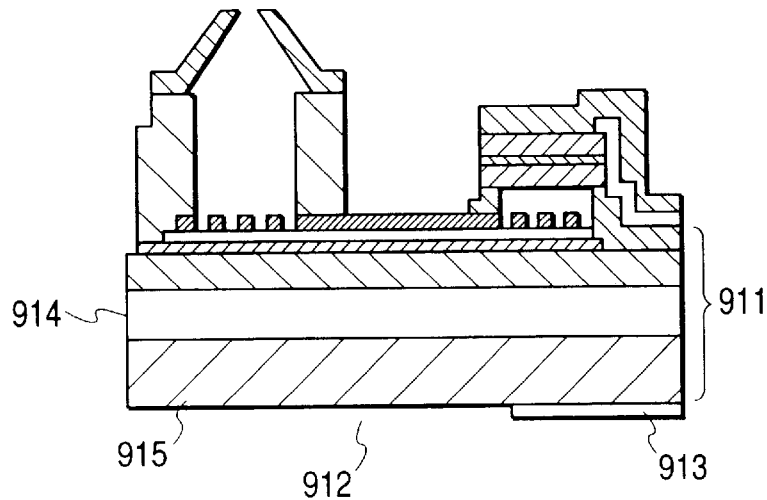
FIGS. 11G and 11H are schematic illustrations of part of the method of preparing a near-field optical probe according to the invention.
Figure 11H:
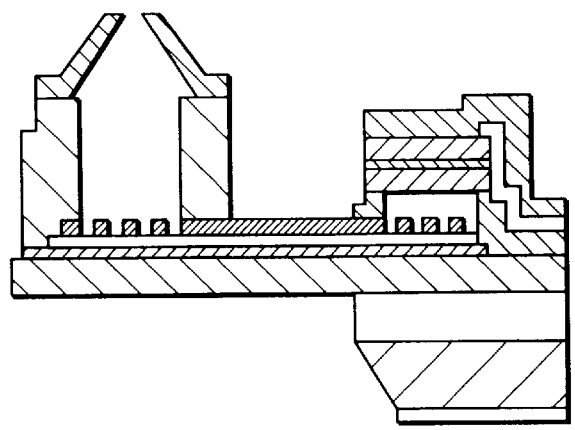

Then, an $Si_3N_4$ film mask 913 having an opening is formed on the rear surface of the SOI substrate 911 in order to turn it into a cantilever (FIG. 11G). Finally, after covering the surface with a protection film, the Si substrate 915 is removed from the rear side by anisotropic etching, using a KOH solution, and then the $SiO_2$ thin film 914 under the opening is removed by using an HF solution to produce a finished near-field optical probe (FIG. 11H).

Now, possible applications of a near-field optical probe prepared in a manner as described above will be discussed below by referring to FIGS. 12 through 15.

Figure 12:
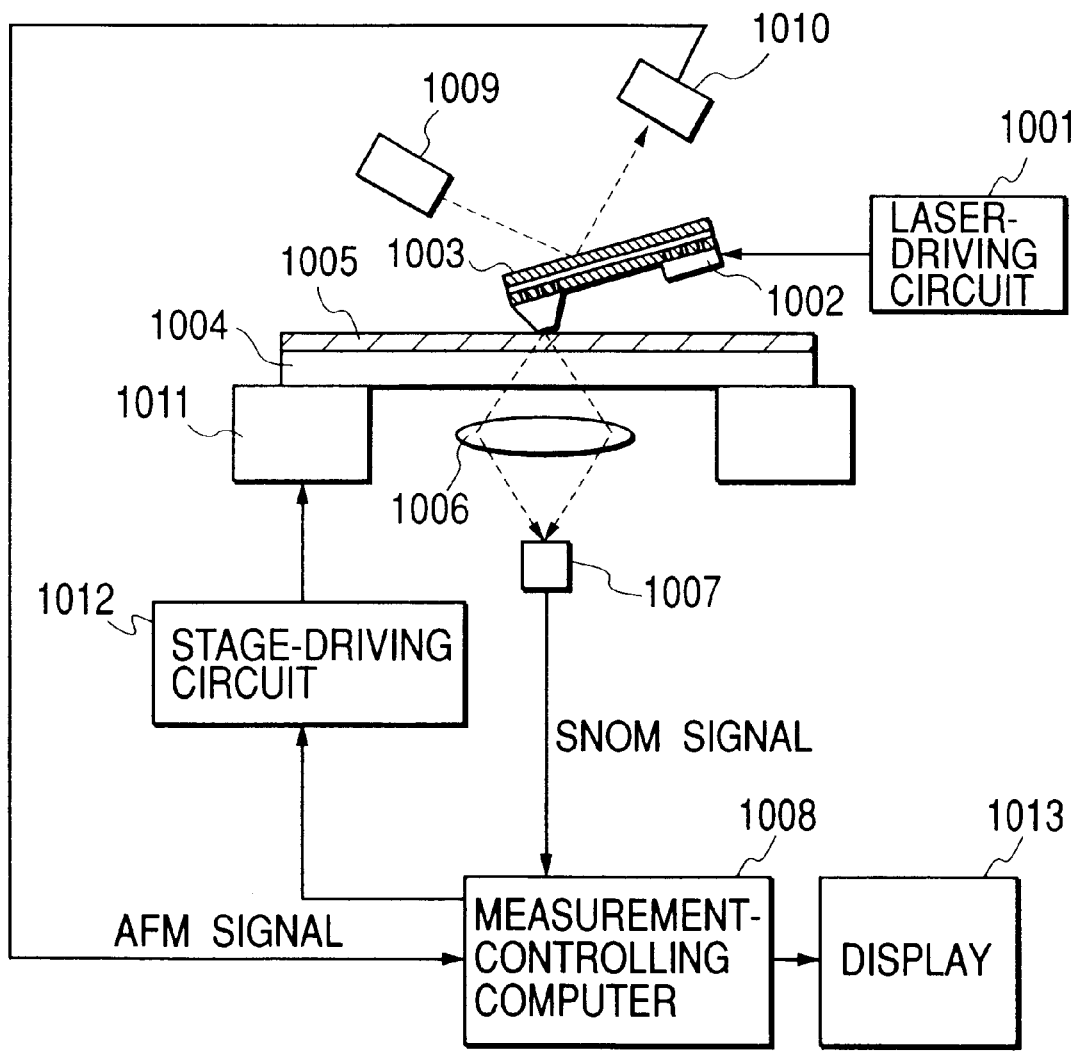
FIG. 12 is a schematic illustration of the configuration of a near-field optical microscope (SNOM) of an illumination mode prepared by applying a near-field optical probe according to the invention.

FIG. 12 is a schematic illustration of the configuration of a near-field optical microscope (SNOM) of an illumination mode prepared by applying a near-field optical probe according to the invention.

Referring to FIG. 12, the laser beam emitted from a vertical-cavity surface-emitting laser 1002 that is driven by a laser driving circuit 1001 is transformed into surface plasmon polaritons, which are transmitted through a waveguide arranged in the near-field optical probe 1003 and emitted through the micro-aperture at the front end of the probe as evanescent light. Then, the micro-aperture of the near-field optical probe 1003 is brought as close as less than 100 nm to the surface of the specimen 1005 arranged on the substrate 1004 so that evanescent light is emitted through the micro-aperture to produce scattered light, which is then converged by a condenser lens 1006 and detected by a photomultiplier tube 1007. The detected light is used as an SNOM signal and input to a measurement control computer 1008.

The laser beam emitted from an AFM laser 1009 is applied to the rear surface of the cantilever of the near field optical probe 1003. The change of angles with respect to the reflected beam is detected by way of a two-piece sensor 1010 to determine the amount of flexure of the cantilever, thereby obtaining an atomic force microscopic (AFM) signal that reflects the surface profile of a specimen to be input to the measurement control computer 1008.

The measurement control computer 1008 outputs drive signals for driving an xyz stage 1011 by way of a stage-driving circuit 1013 so that the xyz stage 1011 is controlled for its three-dimensional position.

Thus, the measurement control computer 1008 causes the front end of the near-field optical probe 1003 to scan the specimen 1005 by driving the xyz stage, and then in response to the position of the probe the SNOM signals and the AFM signals are three-dimensionally plotted in order to form the SNOM image and an AFM image of the surface of the specimen to display the images on a display 1013.

In this experiment, an illumination mode SNOM was prepared by using a near-field optical probe according to the invention and used to scan flexible specimens including bio-molecules without destroying the surface of the specimen, even when bringing the front end of the probe into contact with the surface of the specimen. As a result, a SNOM image and an AFM image could be observed for the surface of each specimen on a stable basis.

Figure 13:
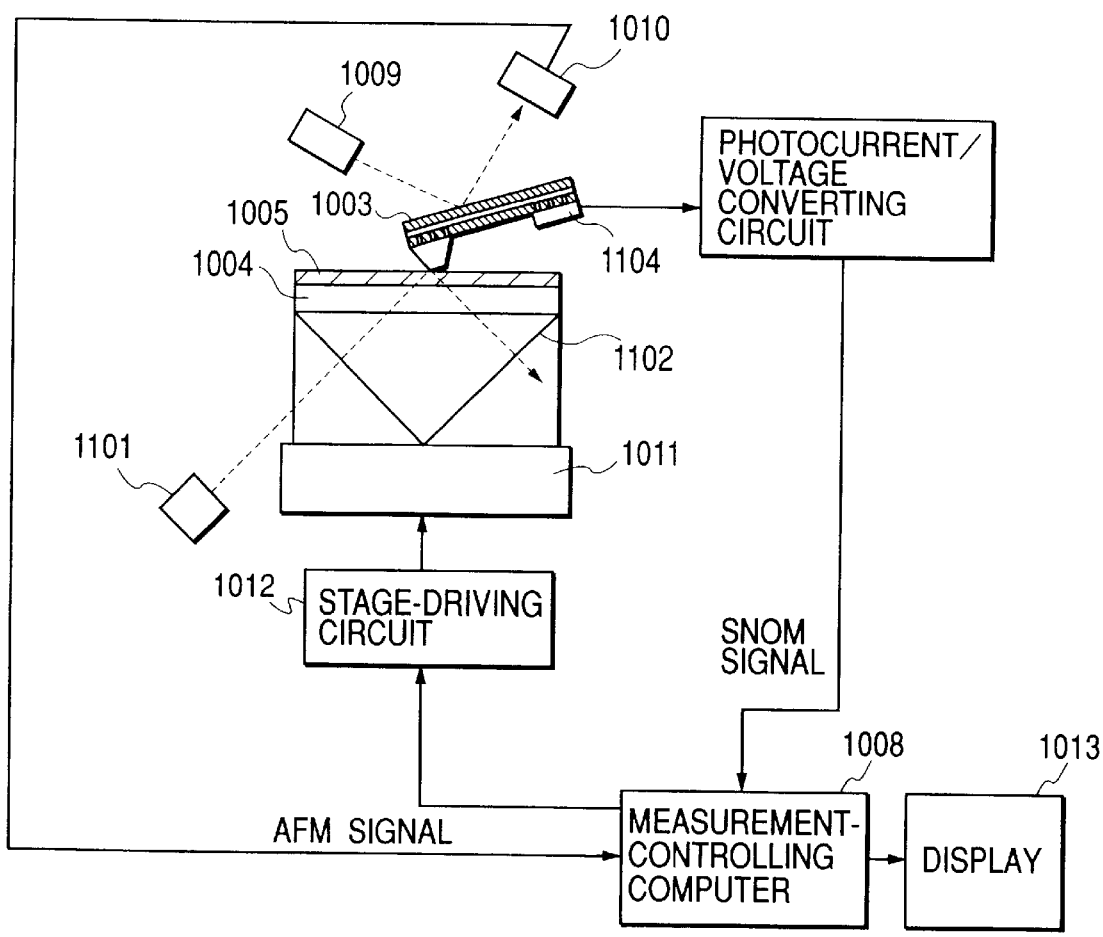
FIG. 13 is a schematic illustration of the configuration of a near-field optical microscope (SNOM) of a collection mode prepared by applying a near-field optical probe according to the invention.

FIG. 13 is a schematic illustration of the configuration of a near-field optical microscope (SNOM) of a collection mode prepared by applying a near-field optical probe according to the invention.

Referring to FIG. 13, the laser beam emitted from an SNOM laser 1101 is made to strike the rear surface of a specimen 1005 arranged on a substrate 1004 that is fitted to a rectangular prism 1102 at an angle good for causing total reflection. Evanescent light produced on the surface of the specimen as a result thereof is detected at the micro-aperture of the front end of the near-field optical probe 1103 and transformed into surface plasmon polaritons, which are then transmitted through a waveguide in the near-field optical probe to detect it by means of a photodiode 1104 as an SNOM signal, which SNOM signal is then input to a measurement control computer 1008.

Otherwise, this SNOM operates the same as the above described illumination mode SNOM.

In this experiment, a collection mode SNOM was prepared by using a near-field optical probe according to the invention and used to scan flexible specimens including bio-molecules without destroying the surface of the specimen, even when bringing the front end of the probe into contact with the surface of the specimen. As a result, a SNOM image and an AFM image could be observed for the surface of each specimen on a stable basis.

Figure 14:
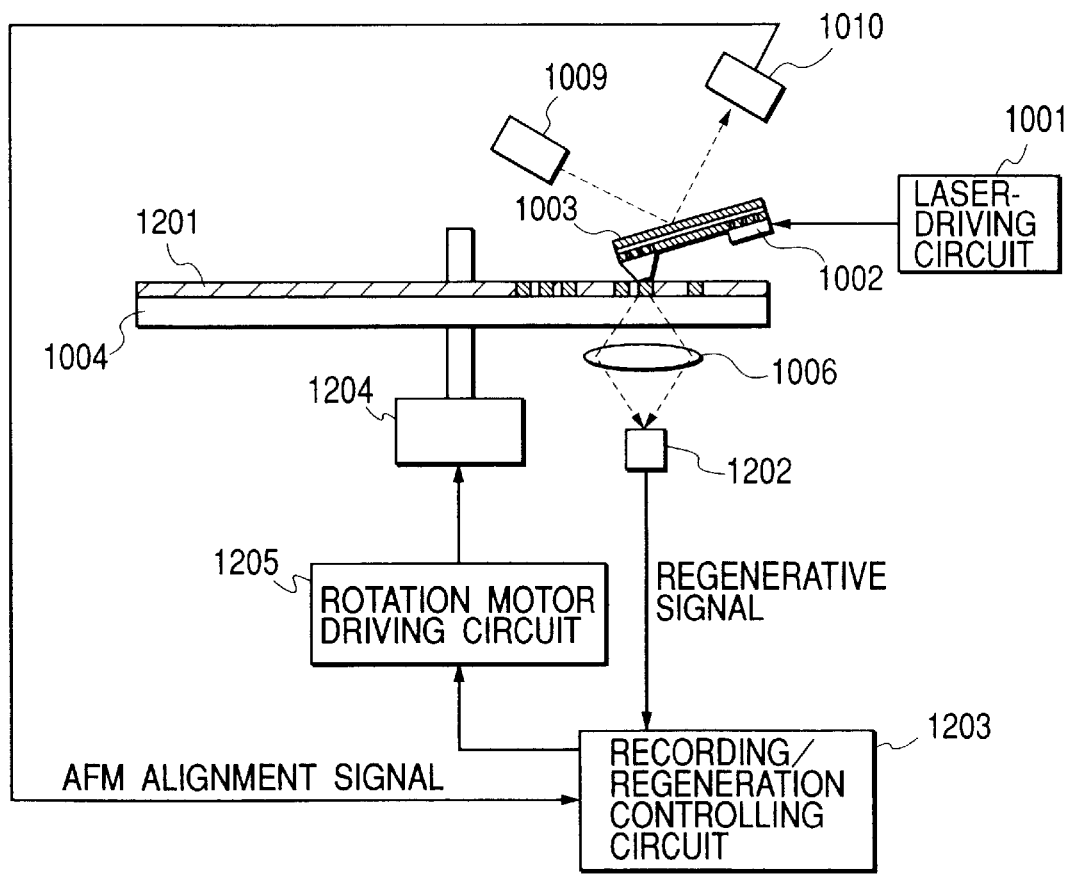
FIG. 14 is a schematic illustration of the configuration of a storage device prepared by applying a near-field optical probe according to the invention.

FIG. 14 is a schematic illustration of the configuration of a storage device prepared by applying a near-field optical probe according to the invention. As in the case of the above described illumination mode SNOM, evanescent light produced from the micro-aperture of the front end of the near-field optical probe 1003 is made to irradiate a recording medium 1201 arranged on a substrate to conduct an operation of data recording/regeneration. Evanescent light with a high intensity is used for recording signals by increasing the intensity of the emitted laser beam, whereas evanescent light with a low intensity is used for irradiating the recording medium 1201 to collect the scattered and transmitted light by lowering the intensity of the emitted laser beam in order to reproduce signals, which are then input to a recording/regeneration control computer 1203.

The recording/regeneration control computer 1203 drives a rotation motor 1204 by way of a rotation motor driving circuit 1205, thereby rotating the recording medium 1201 relative to the near-field optical probe 1033. As in the case of the above described illumination mode SNOM, the obtained AFM signals are input to the recording/regeneration control computer 1203 as control signals, which are then used for the purpose of aligning (tracking) the recording medium 1201 relative to the near-field optical probe 1003.

In this experiment, a storage device was prepared by using a near-field optical probe according to the invention and used to scan flexible recording media including those made of organic materials without destroying the surface of the specimen, even when bringing the front end of the probe into contact with the surface of the recording medium. As a result, signals could be recorded and regenerated on a stable basis.

Figure 15:
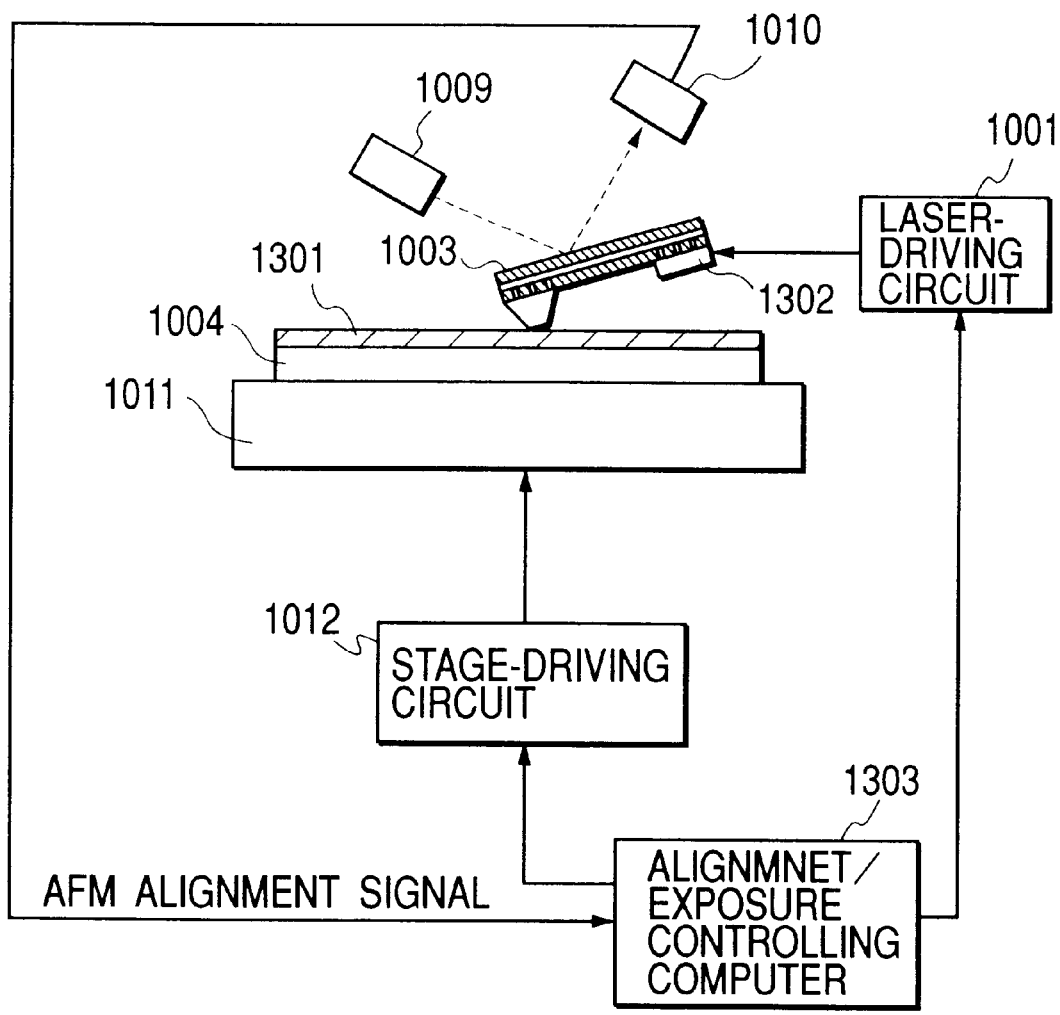
FIG. 15 is a schematic illustration of the configuration of a micro-fabrication apparatus prepared by applying a near-field optical probe according to the invention.
Figure 16:
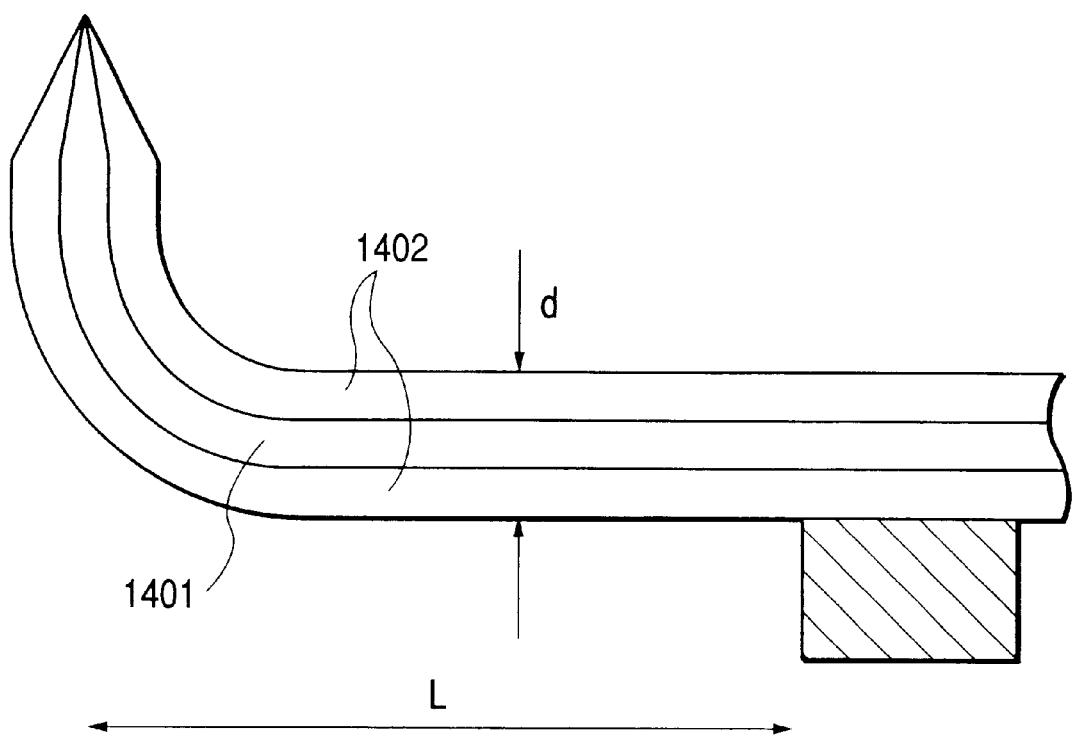
FIG. 16 is a known optical probe prepared by using an optical fiber.

FIG. 15 is a schematic illustration of the configuration of a micro-fabrication apparatus prepared by applying a near-field optical probe according to the invention. As in the case of the above described illumination mode SNOM, evanescent light produced from the micro-aperture of the front end of the near-field optical probe 1003 is made to irradiate a piece of resist 1301 arranged on a substrate in order to expose the resist 1301 to light (and form a latent image). It will be noted that the vertical-cavity surface-emitting laser 1302 used for the exposure is so selected as to generate light with the wavelength that is good for the exposure.

As in the case of the above described illumination mode SNOM, the obtained AFM signals are input to an alignment/exposure controlling computer 1303 and used for the purpose of aligning the resist 1301 relative to the near-field optical probe 1003.

In this experiment, a micro-fabrication apparatus was prepared by using a near-field optical probe according to the invention and used for micro-fabrication operations without destroying the surface of the object, even when bringing the front end of the probe into contact with the surface of the object to be micro-fabricated. As a result, the objects could be micro-fabricated on a stable basis.

As described above in detail, according to the invention, a cantilever near-field optical probe with a high resonance frequency and a low modulus of elasticity can be realized by forming a waveguide for transmitting surface plasmon polaritons to the cantilever of the near-field optical probe so as to transmit light in a state of surface plasmon polaritons. Such a near-field optical probe can be used to scan the surface of a specimen, a recording medium or a resist each having a flexible surface at high speed, by bringing the front end of the near-field optical probe into contact with the surface without damaging the surface, using a contact mode AFM control technique. Accordingly, additionally due to the high resonance frequency, high speed scanning can be carried out.

As a result, it is possible to realize a high resolution SNOM that can be used for high speed measurement, a storage device with a high data transfer rate and a low error rate and a high precision micro-fabrication apparatus providing a high throughput by using a near-field optical probe according to the invention.

What is claimed is:

1. A near-field optical probe comprising:
   a micro-aperture for irradiating and/or detecting evanescent light through the front end of the probe;
   an elastically deformable cantilever supporting the micro-aperture at the free end thereof; and
   a surface plasmon polariton waveguide arranged on the cantilever to guide light from a light source to the micro-aperture and/or to guide light from a light source introduced through the micro-aperture.

2. The near-field optical probe according to claim 1, wherein said cantilever has a thickness not larger than 1 $\mu$m with respect to the direction of elastic deformation.

3. The near-field optical probe according to claim 1, wherein said waveguide for surface plasmon polaritons comprises a plurality of negative dielectric substance thin films and a dielectric substance thin film sandwiched by said plurality of negative dielectric substance thin films.

4. The near-field optical probe according to claim 1, wherein said waveguide for surface plasmon polaritons comprises a plurality of dielectric substance thin films and a negative dielectric substance thin film sandwiched by said plurality of dielectric substance thin films.

5. The near-field optical probe according to claim 1, wherein a member for supporting the fixed end of said cantilever is formed integrally with a light source for causing light to enter into said waveguide for surface plasmon polaritons and/or with a photodetector.

6. The near-field optical probe according to claim 1, further comprising a means for transforming the surface plasmon polaritons transmitted through said waveguide for surface plasmon polaritons into a three-dimensional light wave to emit the three-dimensional light wave.

7. The near-field optical probe according to claim 6, wherein said means for emitting the three-dimensional light wave is selected from the group consisting of a grating coupler, a mirror means to reflect the emission light obtained by transforming the surface plasmon polaritons scattered at an end facet of the waveguide for surface plasmon polaritons into a three-dimensional light wave and a means to scatter the the emission light obtained by transforming the surface plasmon polaritons into a three-dimensional light wave by means of a window formed by partly removing the surface thin film of the waveguide for surface plasmon polaritons.

8. A method of preparing a near-field optical probe comprising the steps of:
   (a) preparing a probe substrate having a surface plasmon polariton waveguide;
   (b) preparing a laser substrate;
   (c) preparing a second probe substrate by forming a groove on a substrate followed by forming a probe layer on the groove except the bottom thereof;
   (d) bonding said first probe substrate with said laser substrate to form a laser profile pattern thereon followed by forming an insulating layer and an upper electrode;
   (e) bonding said first probe substrate subjected to said step (d) and said second probe substrate to transfer said second probe layer on said second probe substrate to a bonding layer formed on said first probe substrate; and
   (f) forming a cantilever probe having a probe proper projecting from the free end thereof by partly removing said first probe substrate subjected to said step (e).

9. A near-field optical microscope comprising a near-field optical probe according to any one of claims 1 through 7.

10. A storage device comprising a near-field optical probe according to any one of claims 1 through 7.

11. A micro-fabrication apparatus comprising a near-field optical probe according to any one of claims 1 through 7.

* * * * *

UNITED STATES PATENT AND TRADEMARK OFFICE
CERTIFICATE OF CORRECTION

PATENT NO. : 6,408,123 B1
DATED : June 18, 2002
INVENTOR(S) : Kuroda et al.

It is certified that error appears in the above-identified patent and that said Letters Patent is hereby corrected as shown below:

Column 1,
Line 40, "be,totally" should read -- be totally --; and
Line 56, "axix" should read -- axis --.

Column 2,
Line 2, "above" should read -- above- --.

Column 7,
Line 27, "above described" should read -- above-described --; and
Line 53, "above described" should read -- above-described --.

Column 8,
Line 26, "above described" should read -- above-described --.

Column 11,
Line 5, "above" should read -- above- --;
Line 17, "above" should read -- above- --;
Line 34, "above described" should read -- above-described --;
Line 51, "above described" should read -- above-described --; and
Line 59, "above described" should read -- above-described --.

Column 12,
Line 66, "the the" should read -- the --.

Signed and Sealed this

Thirty-first Day of December, 2002

JAMES E. ROGAN
*Director of the United States Patent and Trademark Office*